United States Patent [19]

Campbell

[11] Patent Number: 4,551,604
[45] Date of Patent: Nov. 5, 1985

[54] METHOD AND APPARATUS FOR FABRICATING HONEYCOMB SEAL

[75] Inventor: James R. Campbell, South Laguna, Calif.

[73] Assignees: Thomas P. Mahoney, Balboa Island; Donald A. Ruston; Robert S. Barnes, both of Newport Beach, all of Calif. ; a part interest to each

[21] Appl. No.: 503,542

[22] Filed: Jun. 13, 1983

[51] Int. Cl.[4] ...................... B23K 11/06; B23K 11/32
[52] U.S. Cl. ............................... 219/78.12; 219/78.11; 219/81
[58] Field of Search ..................... 219/78.11, 78.12, 84, 219/82, 83; 228/181

[56] References Cited

U.S. PATENT DOCUMENTS

| | | | |
|---|---|---|---|
| 2,821,616 | 1/1958 | Spott | 219/78.11 |
| 3,320,399 | 5/1967 | Luthi | 219/78.11 |
| 3,458,684 | 7/1969 | Rouyer et al. | 219/81 |

*Primary Examiner*—C. L. Albritton
*Assistant Examiner*—Catherine M. Sigda
*Attorney, Agent, or Firm*—Thomas P. Mahoney

[57] ABSTRACT

An apparatus is provided for forming a circular, honeycomb-type engine seal from pre-formed core strip having male and female nodes. The apparatus includes a source of strip and means for forming the strip into a circular seal configuration wherein the male and female nodes of the strip are automatically juxtaposed to each other for weldment as relative movement between the forming means and the source occurs to withdraw additional strip from the core strip source. As the relative movement continues, the juxtaposed male and female nodes are exposed to welding head means of the apparatus which welds the male and female nodes to one another. The forming means includes means for causing said relative movement constituted by drive means which is adjustable to permit forming means of different sizes to be utilized. The movement of the forming means permits successive layers or laminae of the strip to be welded to each other in circular form until a seal of the desired dimension is achieved. The method of the invention involves the step of simultaneously welding a plurality of male and female nodes which are juxtaposed to each other, and the additional step of welding pairs of nodes which are interspersed between previously welded pairs and the further step of utilizing the welding of a selected pair of nodes as a signal for the simultaneous weldment of additional pairs.

34 Claims, 18 Drawing Figures

METHOD AND APPARATUS FOR FABRICATING HONEYCOMB SEAL

BACKGROUND OF THE INVENTION

Reference is made hereby to co-pending application Ser. No. 457,168 filed Jan. 13, 1983 for Honeycomb Seal Structure. In that application the background of the utilization of various types of honeycomb seals is set forth in detail and the art relating to honeycomb seals is exhaustively analyzed.

However, there is not disclosed in that application the apparatus and method of the present application. As is mentioned in the co-pending application, the present practice of fabricating honeycomb seals involves a patchwork construction consisting of subsequently curved pieces of flat honeycomb core. This entails the joining of the pieces and the subsequent machining of the resulting seal member after the patching process, spike welding and brazing of the seal to a supporting structure is accomplished. This machining is an expensive and time-consuming process which, taken in conjunction with the previous assembly of flat core components of the seal, results in the high procurement costs thereof.

To applicant's knowledge, no apparatus for fabricating a circular engine seal of the honeycomb type from a continuous length of pre-formed core strip having male and female nodes is disclosed in the art or has been utilized by honeycomb seal fabricators.

OBJECTS AND ADVANTAGES OF THE INVENTION

A primary object of the invention is the provision of an apparatus for fabricating a circular, honeycomb-type seal from a metallic, pre-formed core strip having male and female nodes thereupon, which includes a source of continuous strip; means for forming said strip into a circular configuration and arranging successive laminae of said strip in superimposed relationship with said male and female nodes juxtaposed to one another; and welding head means for welding the juxtaposed male and female nodes to each other to provide a seal of circular configuration and of the desired size.

An associated object of my invention is the provision of an apparatus of the aforementioned character which can be utilized to fabricate engine seals to different diameters, different widths and different honeycomb cell size, thus permitting the utilization of the apparatus for fabricating honeycomb-type engine seals which will serve a wide variety of ultimate uses and conform to a wide variety of specifications.

A further object of my invention is the provision of an apparatus of the aforementioned type which includes means for forming the pre-formed core strip into a circular configuration which is itself of cylindrical configuration and includes supporting means thereupon for supporting the core strip as it is wound about the forming means.

An associated object of my invention is the provision of forming means of the aforementioned character which is conductive or has a conductive surface thereupon to integrate the seal being formed into the welding circuit.

An additional object of my invention is the provision of an apparatus of the aforementioned type in which the strip source is adjustable to permit different cell sizes, foil thicknesses and widths of core strip to be dispensed therefrom so that engine seals having different cell sizes, core heights and densities may be fabricated on a single apparatus.

A further object of my invention is the provision of an apparatus of the aforementioned character wherein the forming means is rotatable by associated drive means and wherein the associated drive means is adjustable to permit the utilization of forming means of different sizes to fabricate engine seals of different diameters.

A primary object of my invention is the provision of an apparatus of the aforementioned type which will fabricate by weldment an engine seal which can be readily installed in a supporting ring without modification of the seal and which seal need not be machined in order to cause it to conform to specifications for such engine seals. Such precise conformity to manufacturer's specifications for the engine seals fabricated on the apparatus of my invention is attributable to the elimination of the irregularities caused by the previously referred to patchwork method of fabricating conventional engine seals and is also attributable to the elimination of the anticlastic phenomenon encountered when the patchwork method is utilized.

It is generally intended that the apparatus of my invention will permit the fabrication of a seal from a single length of core strip would into circular configuration by conformity to the perimeter of the cylindrical or otherwise shaped forming means. However, it is conceivable that it may be necessary to provide additional lengths of core strip to fabricate unusually large seals to avoid providing core strip sources which are so large as to be difficult to handle.

To facilitate the utilization of additional lengths of core strip, the apparatus includes splicing means interposed between the core strip source and the forming means whereby the end of a core strip length on the forming means can be spliced to the feed end of a core strip issuing from a supply of core strip without the necessisty of removing the partially fabricated engine seal from the associated forming means.

An additional object of my invention is the provision of welding head means located about the ambit of rotational movement of the forming means to weld adjacent male and female nodes of the core strip to one another as the core strip is successively wound into superimposed circular laminae about the perimeter forming means.

Another object of my invention is the provision of welding head means which includes a plurality of welding heads having welding electrodes individually engageable with successive juxtaposed male and female nodes to accomplish simultaneous weldment of a plurality of juxtaposed male and female nodes during rotational movement of the nodes past the welding heads on said forming means.

A further object of my invention is the provision of welding heads which include rotary electrodes engageable with successive corrugations of the core strip to cause rotation thereof and to cause welding projections upon said electrodes to weld juxtaposed male and female nodes to one another.

Other objects and advantages of the invention will be apparent from the following specification and the accompanying drawings which are described in detail hereinbelow.

DESCRIPTION OF A PREFERRED EMBODIMENT OF THE INVENTION

Figure 1:
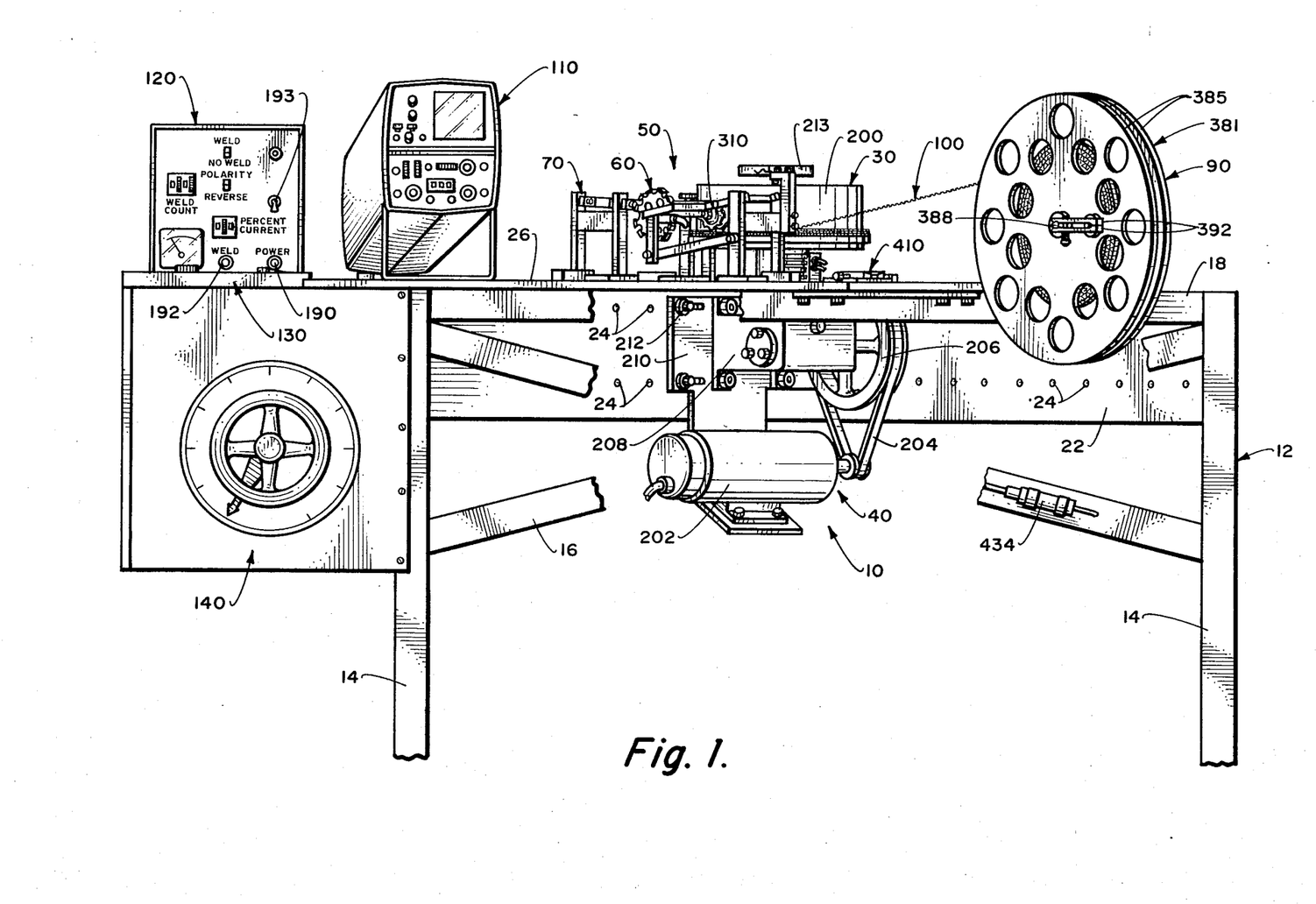
FIG. 1 is a side elevational view generally illustrating the various components of the apparatus.
Figure 2:
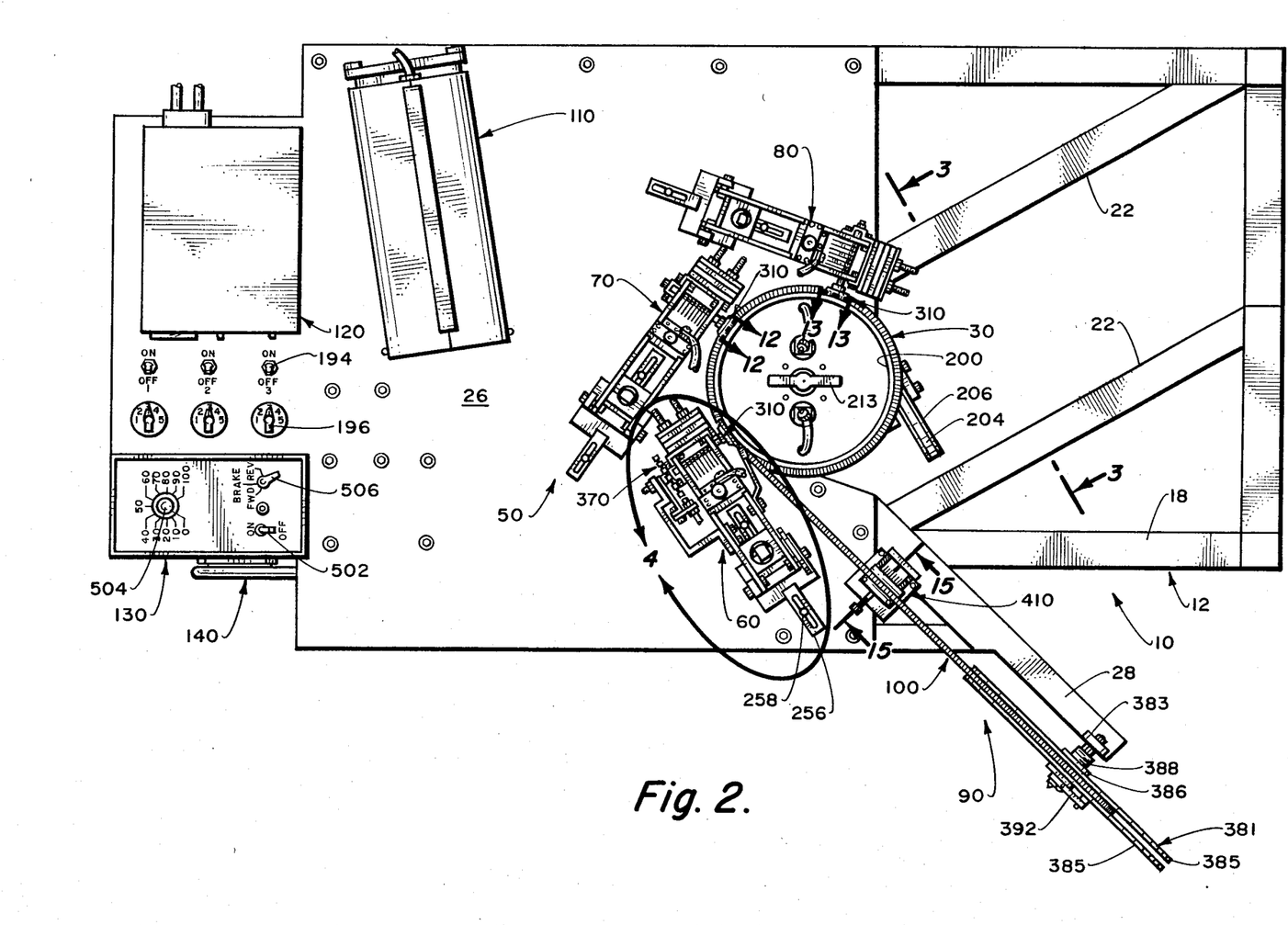
FIG. 2 is a top plan view of the components of the apparatus shown in FIG. 1.

Referring to the drawings, and particularly to FIGS. 1 and 2 thereof, I show the welding apparatus 10 of my invention as mounted on a relatively massive supporting table 12 fabricated from steel shapes and including a plurality of supporting legs 14, braces 16 connected therebetween and bed plate supports 18 extending between said legs and rigidified by said braces. Extending diagonally of the table are rigid channels 22 incorporating a plurality of openings 24 for a purpose which will be described in greater detail hereinbelow.

Supported upon the rigidifying structure of the table 12 described hereinabove is a massive bed plate 26, said bed plate having parallel upper and lower surfaces and being sufficiently precisely formed to accurately mount the various components of the apparatus in operative relationship with one another in order to achieve the ultimate precision necessary for the fabrication of the engine seal on the apparatus in a manner to be described.

AN OVERVIEW OF THE APPARATUS

In order to impart a general understanding of the apparatus 10, a brief general description of the various components thereof is presented here prior to a detailed description of the components and the manner in which they function to achieve the desired end result in a unitary circular engine seal of the honeycomb type.

Mounted on the table 12 is the forming means 30, of the apparatus, said forming means, as best shown in FIGS. 1 and 2 of the drawings, being mounted through and by means of drive means 40, which causes rotational movement of the forming means 30.

Arranged about the perimeter of the forming means 30 and secured adjacent said perimeter is welding head means 50 constituted by a plurality of welding heads including a master welding head 60 and slave welding heads 70 and 80.

Supported upon a bracket 28, FIG. 2, which protrudes angularly from one side of the table 12, is a source 90 of prefabricated core strip 100.

Also mounted upon the table is an oscilloscope 110 which is juxtaposed to a welding control station 120. Ancillary controls indicated at 130 are mounted on the table in proximity to the welding control station 120 and a voltage regulator 140 is also mounted on the table 12.

THE FORMING MEANS

The forming means 30 is constituted by a generally cylindrical drum 200, which may be fabricated from a conductive material such as copper or which may be fabricated from a non-conductive material having a conductive coating, such as a thin layer of copper or other conductive material applied to relevant non-conductive surfaces of the drum 200 upon which successive convolutions of the core strip 100 are ultimately wound in a manner to be described herein in detail below.

The drum 200 is secured to a spindle, not shown, of the drive means 40 which consists of an electric motor 202 connected by a belt 204 to the input shive 206 of a gear reducer 208. The drive means 40 consisting of the electric motor 202 and the gear reducer 208 is mounted by means of a relatively massive bracket 210 to a previously mentioned, diagonally oriented supporting channel 22 having the mounting openings 24 therein which are engaged by mounting bolts 212 to secure the bracket 210 in operative relationship with the supporting table 12 and to maintain the forming means 30 constituted by the rotatable drum 200 in its predetermined position in respect to the bed plate 26 of the table 12.

It will be noted that the plurality of mounting openings 24 permits the adjustment of the drive means 40 and any forming means 30 associated therewith with respect to the table 12 and the bed plate 26 thereof so that forming means 30 of various diameters can be mounted on said drive means to provide engine seals of corresponding different diameters. The massivity of the table 12, the mounting channels 22 and the mounting bracket 210 for the drive means 40 has been emphasized in order that the necessity for rigidity will be appreciated because of the highly precise nature of the formation of the prefabricated honeycomb core strip 100 into the ultimate engine seal.

A screw-type clamp 213 engages the upper extremity of the spindle, not shown, to permit the drum 200 to be mounted on said spindle or to be removed therefrom. A clutch, not shown, permits the drum 200 to rotate on the spindle if an undue load is imposed thereupon.

Figure 3:
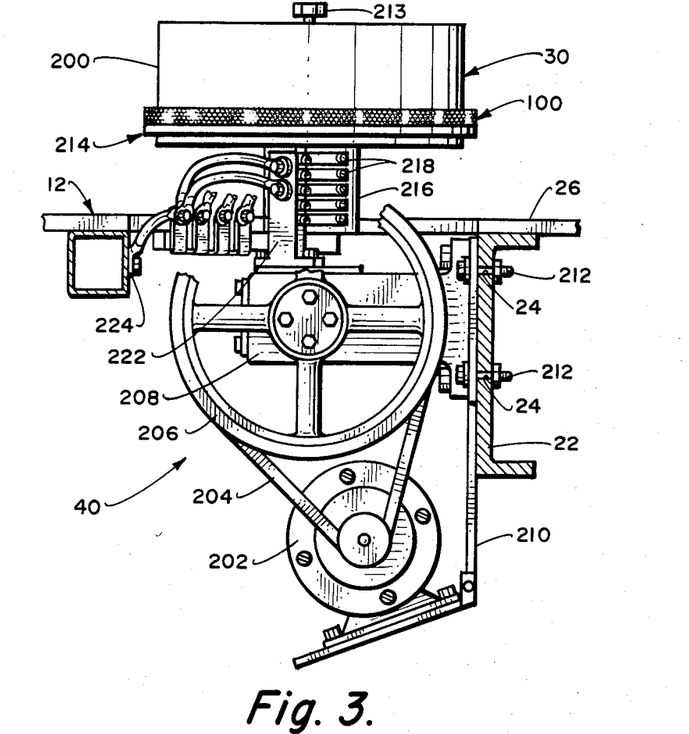
FIG. 3 is an enlarged, fragmentary view of the forming means and drive means therefor taken from the broken line 3—3 of FIG. 2.

Secured to the drum 200, as best shown in FIG. 3 of the drawings, is a support 214 which supports the successive convolutions of the core strip 100 as they are wound about the perimeter of the drum 200.

Formed integrally with, or operatively connected to, the conductive portions of the drum 200 is a conductive hub 216 which is engaged by a plurality of grounding brushes 218 connected to a bus bar 222 which, in turn, is connected to a frame member 224 of the table 12 and to earth ground.

Figure 10:
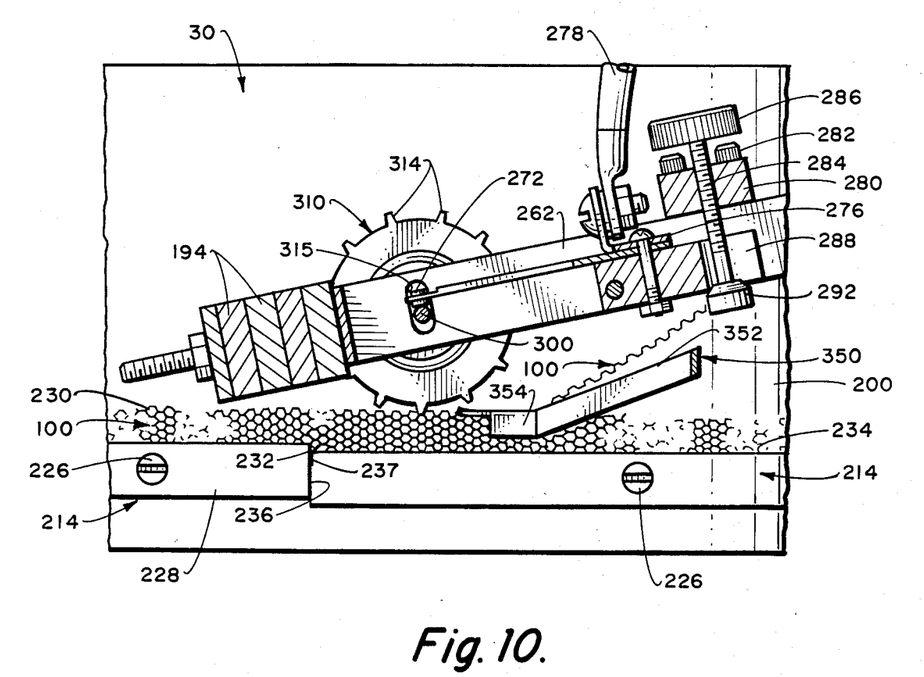
FIG. 10 is a fragmentary sectional view taken from the broken line 10—10 of FIG. 6.

The support 214 on the drum 200 for the successive convolutions of the core strip 100 is shown in greater detail in FIG. 10 of the drawings as being secured to the perimeter of the drum 200 by means of screws 226 and as being constituted by a strip 228 of conductive material, such as copper. It will be noted that, in order to achieve the desired registration of the successive laminae or layers 230 of the core strip 100, the support strip 228 is provided with a ledge 232 which imparts an offset 234 to the support 214 to accommodate the first convolution of the core strip 100. There is also a detent slot 236 provided at the interface between the ledge and the remaining portion of the support to serve a a detent for the free end 237 of the core strip 100 as it is initially applied in operative relationship with the forming means constituted by the drum 200.

The utilization of the bracket 210 for mounting the drive means 40 permits the forming means 30 and drive means 40 to be moved in a unitary manner on the supporting channel 22. Therefore, the bracket 210 can be moved outwardly on the supporting channel 22 by releasing the bolts 212 to permit larger forming means 30 to be utilized. It is contemplated that forming means 30 of as much as six feet in diameter can be mounted on the spindle, not shown, of the drive means 40 and that various sizes intermediate the smaller size, less than three inches in diameter, of forming means 30 and the larger size referred to hereinabove can be mounted on said spindle.

The drive means 40 thus causes rotation of the forming means 30 which is, therefore, rotatable past the welding head means 50, the master welding head 60 and slave welding heads 70 and 80 in a manner which will be described in greater detail below. Furthermore, the manner in which the speed of rotation is controlled will be described in discussing the ancillary controls 130.

WELDING HEAD MEANS 50

As previously indicated, the welding head means 50, as best shown in FIGS. 1-2 and various other figures of the drawings, are located at welding stations adjacent the ambit of rotation of the forming means 30 and include a master welding head 60 and slave welding heads 70 and 80. Since the master welding head 60, best shown in detail in FIGS. 4-10 of the drawings, includes all of the components of the slave welding heads 70 and 80, the description will be confined to the master welding head 60 with the understanding that, exclusive of the components which constitute the master welding head as a master for the slave welding heads 70 and 80, the structure of all of the welding heads is essentially identical.

Figure 4:
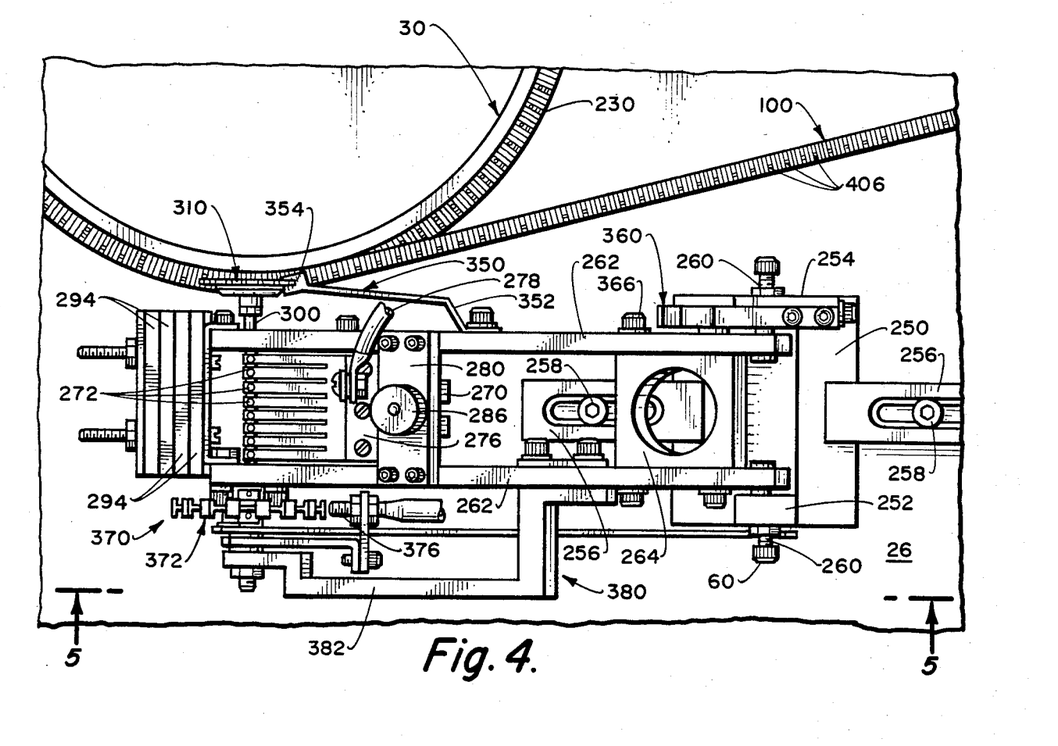
FIG. 4 is an enlarged, fragmentary plan view, from circle 4 of FIG. 2, of the master welding head of the welding head means having the electrode thereof engaged with the core strip.
Figure 5:
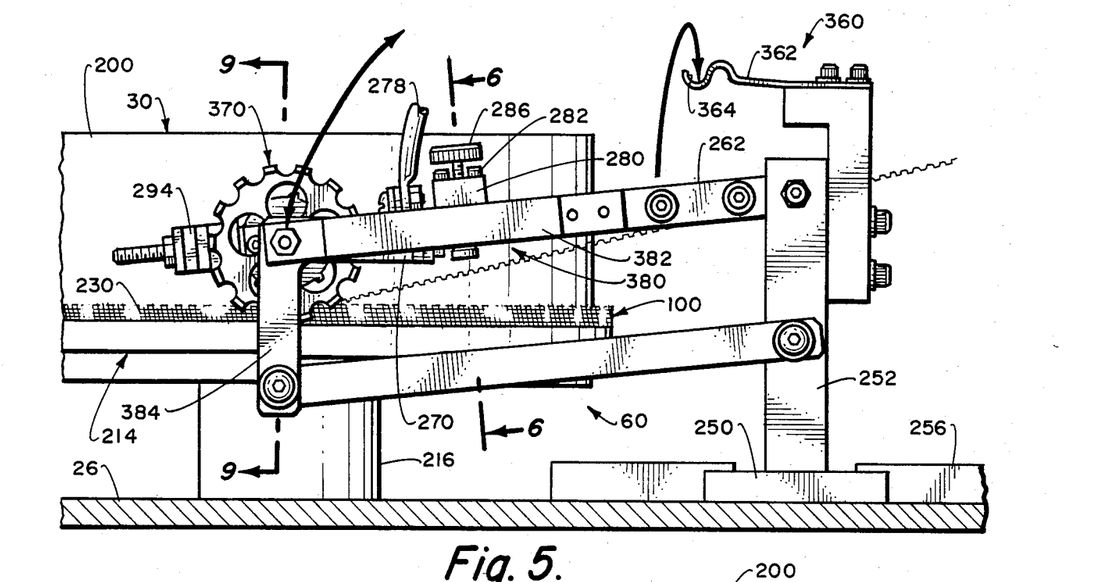
FIG. 5 is an enlarged, fragmentary side elevational view taken from the broken line 5—5 of FIG. 4 and showing the various components of the master welding head.

The master welding head 60, as best shown in FIGS. 4 and 5 of the drawings, includes a base plate 250 which incorporates a vertically-oriented supporting bracket 252. An associated bracket 254 extends vertically from the base plate 250 in spaced relationship with the bracket 252.

A pair of dogs 256 is adjustably secured by bolts 258 to the bed plate 26 and maintains the base plate 250 in a predetermined position with respect to the ambit of rotation of the forming means 30. It will be noted that the dogs 256 may be adjusted and relocated with respect to the bed plate 26 to provide for relocating the welding heads 60, 70 and 80 when the size of the forming means 30 is reduced or increased so that the proper spatial orientation of the welding head means 50 with respect to the ambit of rotation of the forming means 30 can be maintained.

Pivotally mounted for rotation about the axes of supporting shafts, indicated generally at 260, are supporting arms 262 which are maintained in a structurally integrated manner by a connecting plate 264 so that they move simultaneously and equally with each other in a manner to be described in greater detail below.

Figure 6:
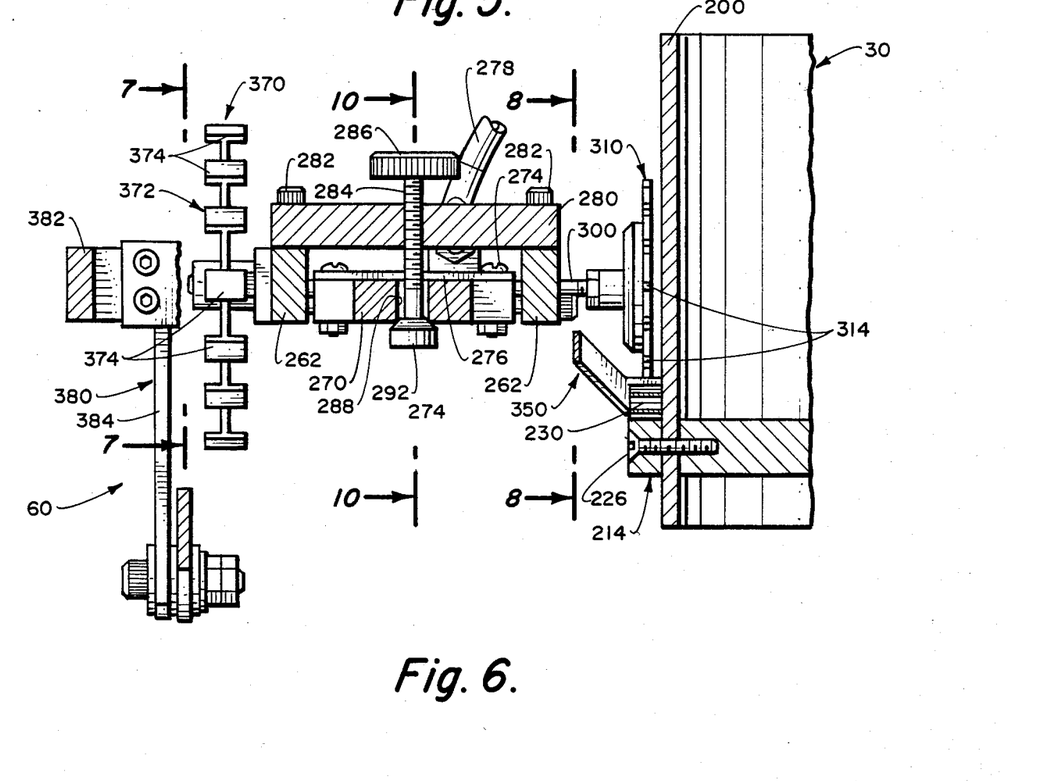
FIG. 6 is an enlarged, fragmentary sectional view taken from the broken line 6—6 of FIG. 5.

Rotatably mounted intermediate the extremities of the supporting arms 262, as best shown in FIGS. 4 and 6, is a support block 270 which has a plurality of welding current conducting fingers 272 mounted thereupon by means of bolts 274, said fingers being fabricated from a single plate 276, FIG. 6, of conductive material and being connected to the source of welding potential by means of a conductor 278.

Spanning the arms 262 is an adjustment block 280, FIGS. 4 and 6, which is connected to the arms 262 by means of bolts 282. Threadedly engaged centrally of the adjustment block 280 is an adjustment screw 284 having a finger engageable knob 286. The lower extremity of the adjustment screw 284, FIG. 6, extends through a bore 288 in the welding conductor mounting plate 270 and has a head 292 thereupon which engages the underside of the conductor mounting plate 270 to permit the adjustment of said mounting plate 270 and the welding conductor fingers 272 thereupon in a manner and for a purpose to be described in greater detail below.

Figure 7:
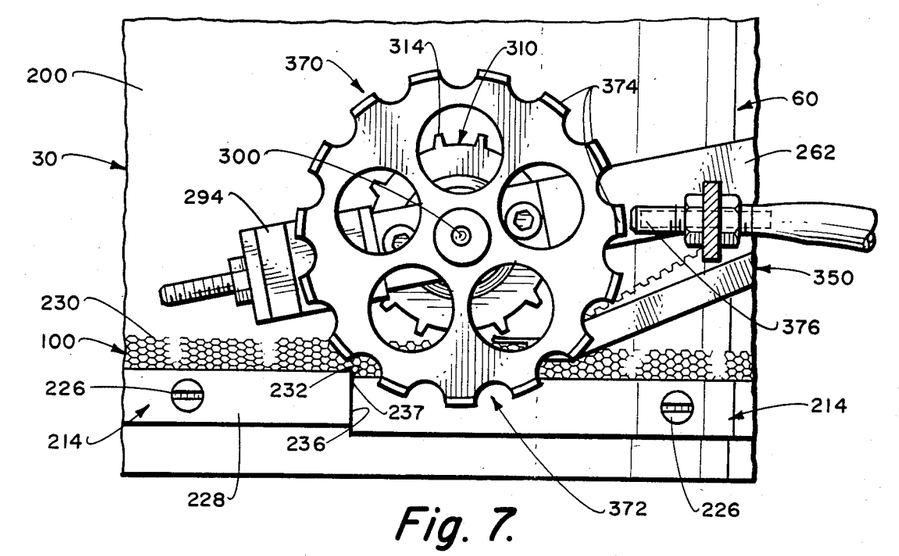
FIG. 7 is a fragmentary elevational view taken from the broken line 7—7 of FIG. 6.

Secured to the forward extremity of the arms 262, as best shown in FIGS. 4, 5 and 7 of the drawings, are weights 294 for urging the arms 262 and all of the various components mounted thereupon downwardly for rotation about the shafts 260.

Although I show the utilization of weights to supplement the gravity-induced downward rotation of the supporting arms 262 about the shafts 260 for various purposes which will be described in greater detail below, it is contemplated that other means for causing downward rotation of the arms 262 may be utilized in substitution for the weights 294.

For instance, an electromotive means of a type well known to those skilled in the art may be utilized and has the advantage of providing a feedback which, with proper instrumentation can determine and display or advise a microprocessor of the extent of the force which causes the rotation of the arms 262 about the shafts 260. The utilization of the weight 294 provides sufficient augmentation of gravitational force to insure the achievement of the various functions of the apparatus in a manner to be described in greater detail below.

Figure 8:
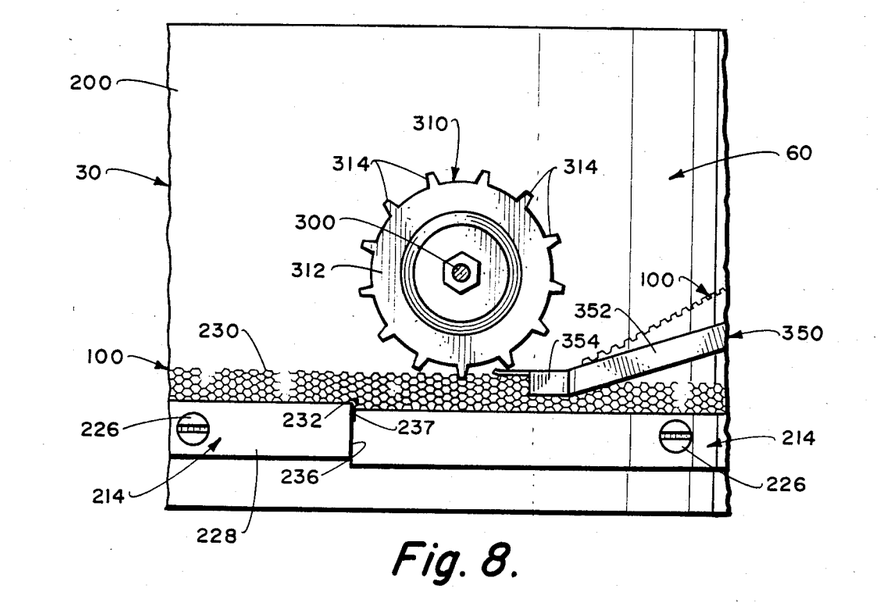
FIG. 8 is a fragmentary sectional view of a rotary electrode taken from the broken line 8—8 of FIG. 6.

Mounted for rotation on and with a shaft 300, FIGS. 6-8 of the drawings, is a rotatable electrode 310, FIG. 8, which, in the present embodiment of the invention, is constituted by a sprocket wheel 312 having a plurality of gear teeth 314 which constitute welding projections to cause the weldment of the contiguous male and female nodes of the core strip during the welding process.

Of course, the shaft 300 is mounted for rotation in the forward extremities of the supporting arms 262, as best shown in FIGS. 4 and 6 of the drawings, and is engaged by the forward extremities of the welding fingers 272 which act as brushes so that the shaft 300, constructed of conductive material, may serve as the means for conducting welding current to the welding electrode 310. It will be noted that the shaft 300, as best shown in FIGS. 9 and 10 of the drawings, has its extremities mounted for upward or downward movement with respect to the forward extremities of the arms 262 in slots 315.

Figure 9:
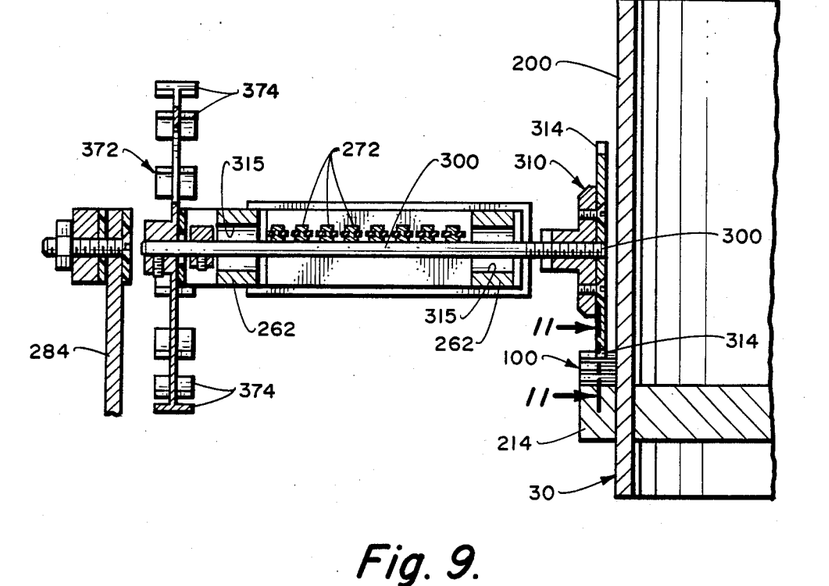
FIG. 9 is an enlarged, fragmentary sectional view taken from the broken line 9—9 of FIG. 5.

The relationship of the welding fingers 272 with the shaft 300 is graphically illustrated in FIGS. 9 and 10 and the impingement of the fingers 272 upon the perimeter of the shaft 300 exerts a downward force thereupon causing corresponding downward movement of the shaft 300 and corresponding movement of the electrode 310 with respect to the outer extremities of the supporting arms 262. In this manner, the relative position of the electrode 310 with respect to the uppermost of the laminae of the core strip being welded can be accurately determined.

In other words, the central location of the welding projections constituted by the gear teeth 314 of the sprocket wheel 312 can be accurately determined. Therefore, in addition to serving as the means of conducting welding potential to the rotatable shaft 300, the welding fingers 272 serve as a means for adjusting the orientation of the shaft 300 and, the welding electrode 310 with respect to the outer extremities of the supporting arms 262. The fingers 272 are adjustable upwardly or downwardly by the adjustment means constituted by the adjustment screw 284 mounted in the adjustment block 280. The above-described components of the master welding head 60 are also incorporated in the slave welding heads 70 and 80 and the master welding head 60 and the slave welding heads 70 and 80 function in the identical manner to accomplish the weldment of the successive laminae of the core strip 100 wound about the perimeter of the forming means 30 in an identical pattern.

As previously indicated, the core strip, generally indicated at 100 in various figures of the drawings, is wound about the perimeter of the forming means 30 constituted by the cylindrical drum 200 and the resultant winding of the core strip about the perimeter of said drum causes the creation of successive core strip laminae 230. The core strip is more fully described in my co-pending application Ser. N. 457,168, filed Jan. 13, 1983, entitled "Honeycomb Seal Structure", but a brief and corresponding description is presented hereinbelow in order that the interaction between the core strip 100 and the welding apparatus of the invention can be adequately described.

Figure 11:
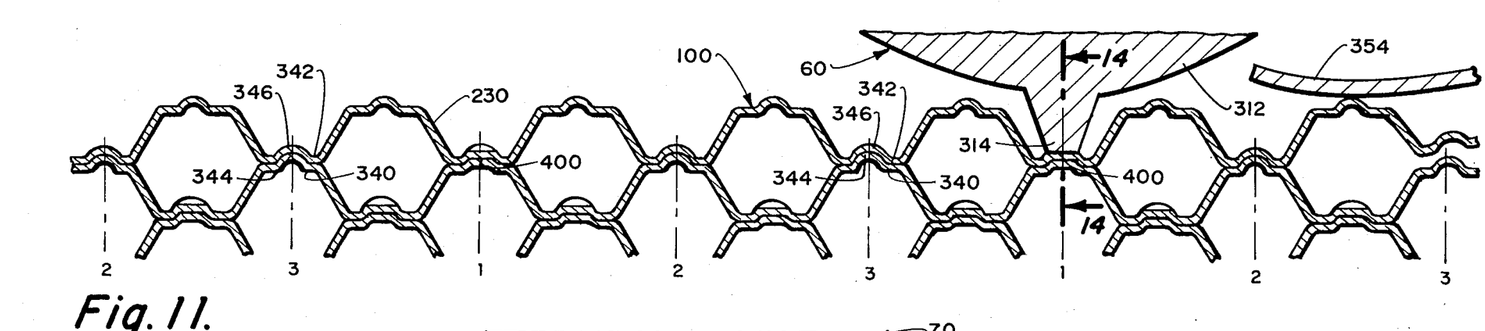
FIG. 11 is an enlarged, fragmentary sectional view taken on the broken line 11—11 of FIG. 9 and illustrating the manner in which the electrode of the master welding head engages juxtaposed male and female nodes.
Figure 12:
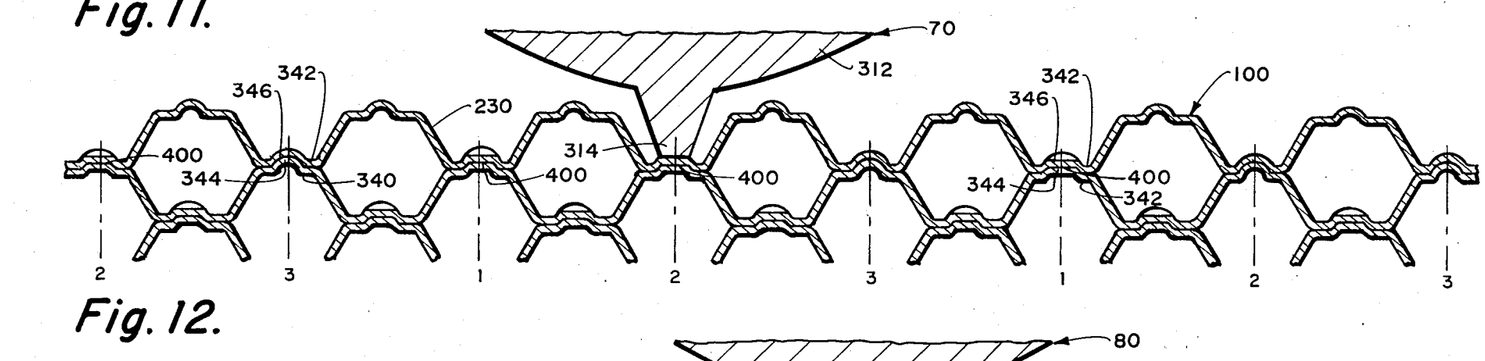
FIG. 12 is a view similar to FIG. 11 taken on the line 12-12 of FIG. 2 and showing the manner in which the electrode of a slave welding head engages an interspersed pair of juxtaposed male and female nodes.
Figure 13:
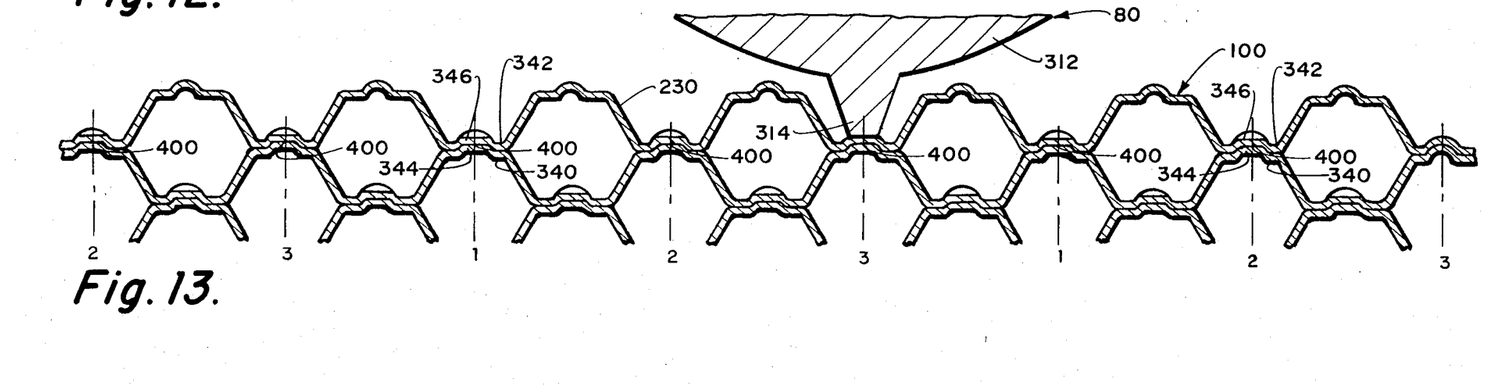
FIG. 13 is a view similar to FIGS. 11 and 12 taken from the line 13—13 of FIG. 2 showing the electrode of another slave welding head engaging juxtaposed male and female nodes interspersed between previously welded male and female nodes.

The core strip is illustrated, greatly enlarged, at 100 in FIGS. 11-13 of the drawings and is fabricated from various types of foil, as specifically mentioned in my co-pending application, and in various gauges. The successive laminae 230 of the core strip 100 are shown in the relationship which they automatically assume as the welding process takes place by the utilization of the apparatus and method of the invention.

The core strip 100 is provided in continuous lengths issuing, as previously mentioned, from the core strip source or supply means 90 and is of generally corrugated or sinuous configuration having male nodes 340 and female nodes 342. Each of the male and female nodes is provided with corresponding male and female beads 344 and 346, respectively. The beads 344 and 346 provide means for locating the male and female nodes 340 and 342 in registration with one another as successive laminae 230 of the core strip 100 are wound about the perimeter of the forming means 30 to bring the male and female nodes 340 and 342 into juxtaposition to each other. Beads or flutes 344 and 346 also provide hinge means to assist in forming the ribbon into a circle and provide for a welding technique as described in Serial No. 457,168.

To facilitate the aforesaid registration of the respective male and female nodes 340 and 342 in operative engagement with each other, as illustrated in FIGS. 11-13 and other figures of the drawings, a strip locating means 350 is mounted upon the innermost arm 262 of the master welding head 60 and includes an elongated arm 352 having a locating foot 354, FIG. 8, mounted upon or formed integrally with the lower extremity thereof. The arm 352 may be fabricated from spring stock and the locating foot 354 thereof is urged downwardly and inwardly onto the strip 100 as it issues from the strip source 90 by the downward movement of the welding head 60 as augmented by the weights 294.

Consequently, as best illustrated in FIGS. 8 and 10 of the drawings, as the forming means 30 is rotated the locating foot 354 urges the relevant portion of the core strip 100 downwardly into co-planar relationship with the underlying laminae thereof to cause the registration of the male and female nodes 340 and 342 in the above-described manner, and inwardly to assure a smooth surface at the open cell ends.

An upper positioning means 360, FIG. 5, is provided on the brackets 252 and 254 and consist of a spring arm 362 having an arcuate recess 364 therein adapted to engage one of the bolts 366, FIG. 4, on the innermost arm 262. The welding heads 60, 70 and 80 are movable between lowermost operative positions in which the rotatable electrodes 310 are engaged upon the relevant portion of the core strip 100 and inoperative uppermost positions in which the arms 262 are pivoted about the shafts 260 into the uppermost position and retained thereby by the positioning means 360, FIG. 5.

Operatively associated with the welding head 60 to constitute the master welding head, is welding control means 370, FIGS. 4-7 of the drawings. The primary purpose of the welding control means 370 is to ensure that, when the welding projections or teeth 314 of the rotatable electrodes 310 are properly positioned upon the nodes to be welded, a welding pulse will automatically be fired so that all three welding heads 60, 70 and 80 will be fired simultaneously.

The welding control means includes, as best shown in FIG. 7 of the drawings, means for locating the position of the projections 314 constituted by a locating wheel 372. The locating wheel 372 is mounted for rotation on the shaft 300 which mounts the rotatable electrode 310 and, consequently, rotates simultaneously therewith.

Provided upon the perimeter of the locating wheel 372 is a plurality of spaced targets 374 which rotate adjacent a proximity switch 376 which emits a welding pulse generating signal when a baffle 374 is juxtaposed thereto, as best shown in FIG. 7 of the drawings. The proximity switch 376 utilized in the present embodiment of the invention is a solid state switch, but a wide variety of similar devices can be utilized in substitution therefor.

Consequently, as the proximity switch 376 tells the weld control to fire, simultaneous welding pulses are generated and conducted to the rotatable welding electrodes 310 through the conductor shafts 300.

In order to insure the accurate registration of the locating wheel 372 with respect to the proximity switch 376 during relative rotational movement of the welding head 60 from its inoperative, uppermost position to its operative, lowermost position, a paralellogram mounting 380 is provided, as best shown in FIGS. 5 and 6 of the drawings. The paralellogram mounting 380 includes pivotally mounted arms 382 and 384 with the proximity switch 376 mounted thereupon to cause the proximity switch to accurately track during the movement of the welding head 60 between its upper and lowermost positions.

CORE STRIP SOURCE

As previously indicated, a core strip source 90 is provided adjacent the forming means 30 and includes a reel 381 which, as best shown in various figures of the drawings, is supported on a shaft 383 mounted on the bracket 28 extending angularly from the table 12. The reel 381, as best shown in FIG. 1 of the drawings, includes a pair of disks 385 mounted for rotation about the shaft 383, said disks being adjustable by adjustment means 386 constituted by a threadedly adjustable member 388. A clutch 392 is provided to properly tension and prevent freewheeling of the supply means which would cause improper tension to be placed upon the strip 100 as it is drawn therefrom by rotation of the rotary drum 200 constituting the strip forming means 30.

Figure 14:
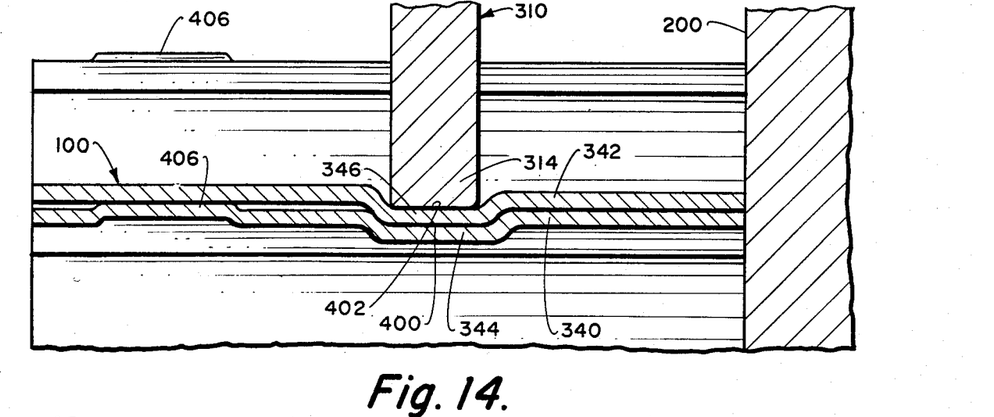
FIG. 14 is an enlarged, vertical sectional view taken on the broken line 14—14 of FIG. 11.

The manner in which the welding projections 314 on the respective rotary electrodes 310 operate to form weldments 400 between adjacent male and female nodes 340 and 342, respectively, is best shown in FIG. 14 of the drawings. As the welding projections 314 engage the female locating means constituted by the beads 346 they urge them against the underlying male locating bead means 344 to cause momentary softening of the metal and the formation of a dimple 402 at the weldments 400. Becaue of the uniform and downward movement of the welded area in the manner described, the well-known deleterious burning and perforation of the metal incident to the utilization of prior art welding methods is eliminated.

THE SPLICING MEANS

Also shown in FIG. 14 are the anti-keystone bosses 406 which are provided on the male beads or locating means 344 to forestall the keystone effect which occurs if the anti-keystone bosses 406 are not provided. The cumulative keystoning of successive laminae which would distort the resultant seal is thus avoided.

Figure 15:
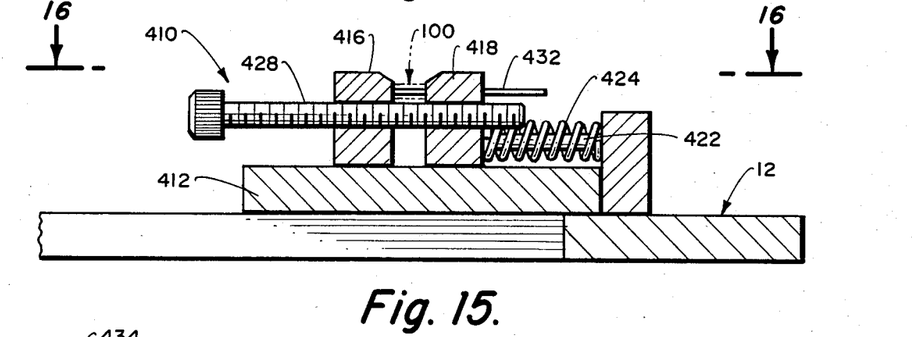
FIG. 15 is a transverse sectional view taken on the broken line 15—15 of FIG. 2 and illustrating the splicing means of the apparatus.
Figures 16, 17:
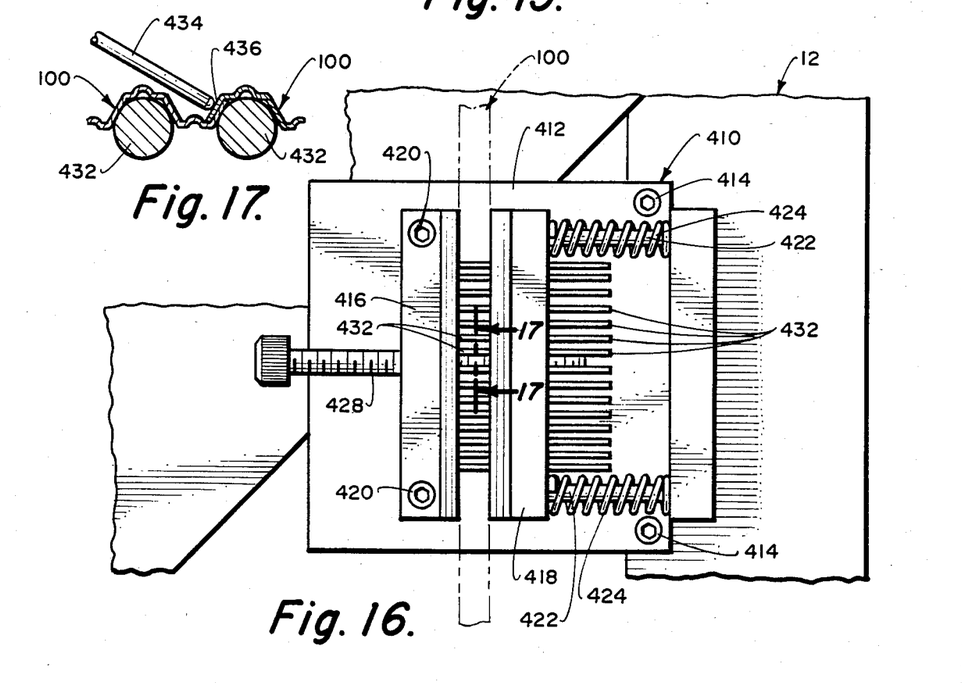
FIG. 16 is a top plan view taken from the broken line 16—16 of FIG. 15.
FIG. 17 is an enlarged, fragmentary sectional view taken from the line 17—17 of FIG. 6 illustrating the splicing of respective lengths of core strip to each other.

Splicing means 410 is mounted on the table 12 between the strip source 90 and the seal forming means 30. The splicing means 410, as best shown in FIGS. 15-16 of the drawings, includes a base 412 secured to the table 12. A pair of guideblocks 416 and 418 is mounted on the base 412, the guideblock 416 being fixed by means of bolts 420. The guideblock 418 is movable on guide pins 422 and is biased toward the fixed guideblock 416 by compression springs 424.

An adjustment bolt 428 threadedly engaged in both the fixed and movable blocks 416 and 418, respectively, adjusts the spacing between the blocks to accommodate the width of the core strip 100 being spliced therein. A plurality of fingers 432 is provided which, as best shown in FIG. 17 of the drawings, serve as supports for the strips 100 being welded to each other by a welding electrode 434 to create an overlapping joint 436. The electrode 434 is provided on the table 12 so that when a length of core strip 100 issuing from the core strip source 90 is exhausted, a new reel may be mounted to permit an additional supply of core strip 100 to be spliced to the end of the previous length of core strip.

THE OSCILLOSCOPE

The oscilloscope 110 is of conventional construction and is connected in the welding circuit to visually indicate the weld pulse and the duration thereof. Therefore, the operator of the apparatus 10 can continuously determine the effective performance of the welding circuit and immediately terminate the operation thereof if an aberration is indicated by the visual presentation of the oscilloscope 110.

THE WELDING CONTROL STATION

The welding control station 120 provides various switches and meters for the welding circuit and includes a power on-or-off light 190 and a weld current initiation light 192. An additional switch 193 determines whether a weld pulse will be susceptible of being generated by a signal imparted from the master welding head 60. The additional instruments at the welding control station 120, as best shown in FIG. 2 of the drawings, include individual control switches 194 for controlling the delivery of welding current to the respective heads while rotatable switches 196 modify the amperage of the welding current.

DRIVE MEANS CONTROL

The drive means control 130 for the drive means 40 of the seal forming means 30 includes, as best shown in FIG. 2 of the drawings, a control switch 502 and a speed control 504. Another control lever 506 determines reverse or forward operation and braking of the drive means 40. The drive control means 130 is capable of lowering or increasing speed of rotation of the forming drum 200 and, thus, the speed of rotation of the rotatable electrodes 310 which are driven by the convolutions of the core strip 100. Consequently, the speed at which the drum is rotated causes the speed at which the welds are generated to be increased or decreased depending upon the corresponding increase or decrease in the speed of rotation of the drive means 40.

VOLTAGE CONTROL

An auto transformer voltage regulator 140 is shown in FIG. 1 of the drawings and is connected in the primary of the welding circuit. This regulator can be utilized to control the voltage of the welding circuit. However, I have discovered that the welding pulse can be so finitely controlled by the weld control station that the voltage regulator 140 is generally superfluous and need only be utilized to correct gross voltage variations in the supply circuit.

THE WELDING CIRCUIT

Figure 18:
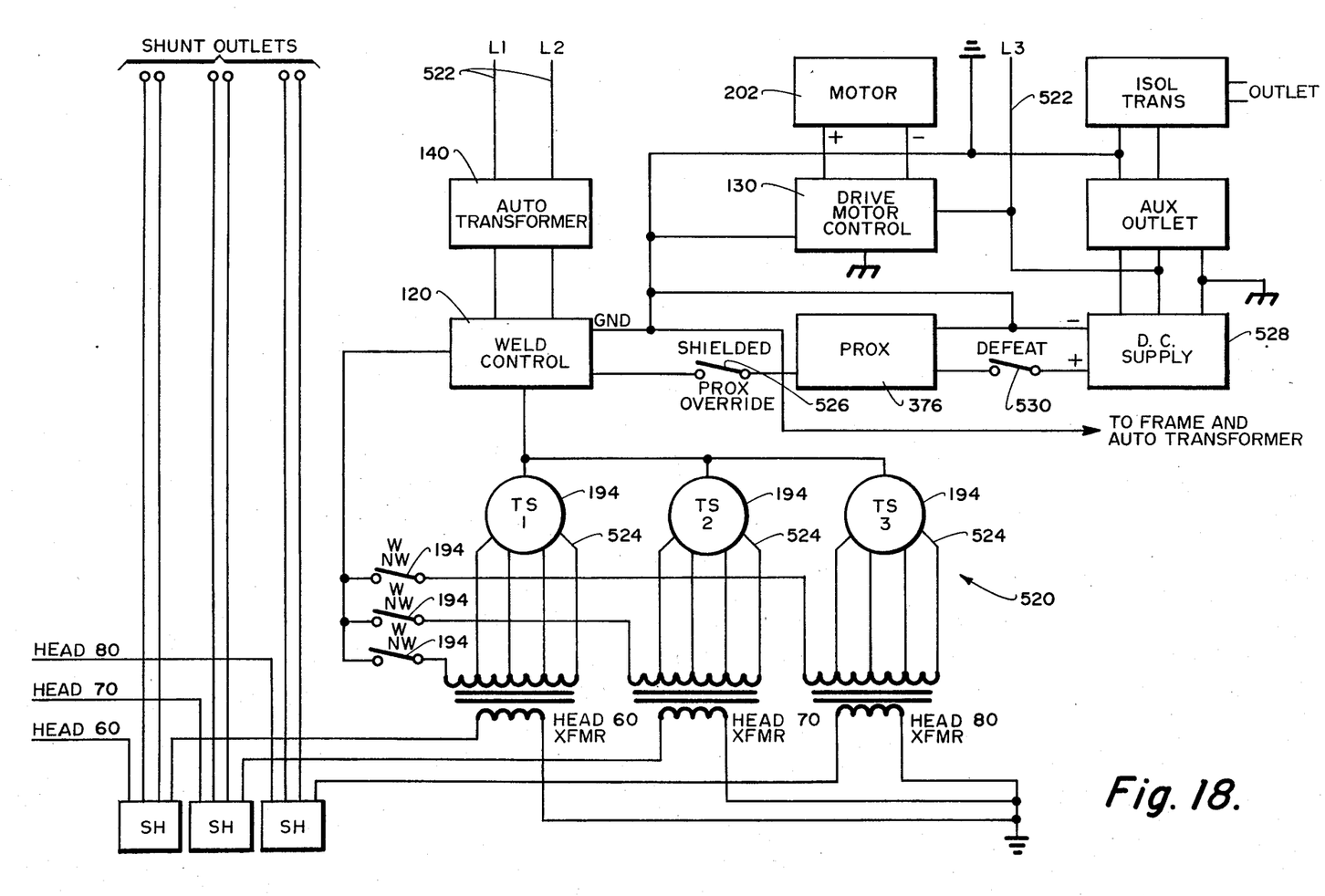
FIG. 18 is a schematic welding circuit diagram illustrating the welding circuit which imparts the welding current into the master and slave welding heads.

The welding control circuit 520, as best shown in FIG. 18 of the drawings, includes the previously discussed voltage regulator 140 connected to the power supply 522. The voltage regulator 140 is, in turn, connected to the welding control 120 which is connected to the toggle switches 194 interposed between the welding control and the transformers 524 for the respective heads 60, 70 and 80. Although the drive motor 202 and the drive motor control 130 are connected to the power supply 522, they are electrically isolated from the welding circuit.

The proximity switch 376 is connected to the welding control 120 by means of a proximity override switch 526 and is, in turn, connected to its DC power supply 528 through a feed switch 530. Therefore, the proximity switch can be rendered inoperative during initial adjustment of the welding apparatus to prevent the firing of the welding control and the resultant energization of the transformers 524.

THE METHOD

The method of the invention contemplates the simultaneous creation of welds interspersed among one another at the locations of the three welding heads. The method of creating the interspersed welds is disclosed in FIGS. 11–13 of the drawings wherein FIG. 1 shows the rotary welding electrode 310 of the first and master welding head 60 engaging the first of the interspersed nodes.

The second interspersed series of weldments is formed by the rotary electrode 310 of the slave welding head 70, as best shown in FIG. 11 of the drawings, and the third series is formed by the rotary electrode 310 of the welding head 80.

Therefore, as the rotary electrodes of the respective heads 60, 70 and 80 are rotated by engagement with the corrugations of the core strip 100, they simultaneously have the welding projections 314 thereof engaging interspersed nodal areas.

The weldment of the nodal areas in the interspersed fashion is accomplished by the additional method of setting up the apparatus 10. Prior to initiating the welding operation, the free end of the core strip 100 is drawn from the core strip source 90 and engaged in the slot 236 provided adjacent the ledge 232 of the supporting means 214 for the core strip. During the additional loading operation the welding heads 60, 70 and 80 may be maintained in the uppermost inoperative positions and the drum 200 is rotated until the first two layers or laminae of core strip 100 are juxtaposed to one another with the male and female nodes 340 and 342 in operative engagement with one another. The welding heads 60, 70 and 80 are then successively lowered into the operative positions in which the welding projections 314 of the rotary electrodes 310 engage the internested male and female nodes 340 and 342. Because of the spacing of the heads, the interspersed nodes are respectively welded successively by each of the welding heads, as illustrated in FIGS. 11–13 of the drawings.

CONCLUSION

The apparatus 10 of the invention, as previously indicated, can be utilized to fabricate seal rings of various diameters and the adjustment of the apparatus to accomplish its utilization in fabrication of larger or smaller rings involves the relatively simple task of providing a larger drum 200 and moving the drive means 40 to position the center of rotation of the drum at the desired location on the table 12. Of course, the welding head means 50 must be redistributed about the ambit of the rotation of the drum, and it is conceivable that a greater number of heads may be utilized as the diameter of the seal is increased.

Furthermore, while I have shown a particular welding circuit, it is not intended that the apparatus be limited to the utilization of that circuit since it will be obvious to those skilled in the art that a wide variety of welding circuit expedients is available for utilization in the context of the apparatus and method of the invention.

I claim:

1. A welding apparatus for fabricating a circular honeycomb-type seal from a continuous preformed metallic strip having male and female nodes, comprising: continuous strip supply means; a cylindrical, strippable forming means juxtaposed to said strip supply, said forming means being conductive and adapted to orient said strip into the circular configuration of said seal as successive laminae of said strip are wound thereabout by rotation of said forming means; welding head means located tangentially of the perimeter of said forming means and engageable with the uppermost lamina of said strip to weld it to the adjacent lamina, said welding head means being driven by engagement with the successive nodes of said metallic strip as caused by rotation of said strip induced by rotation of said forming means; and a welding circuit connected to said welding head means and to said forming means to successively weld the respective adjacent laminae of said strip to each other.

2. The apparatus of claim 1 in which said strip is corrugated to form alternate male and female nodes which are juxtaposed to each other during the rotation of said forming means and said welding head means includes welding electrode means engageable with one of a pair of juxtaposed nodes when said forming means is rotated to cause the deformation of said strip into its circular configuration and to juxtapose said nodes to each other, said welding electrode means being driven by engagement with said node.

3. The apparatus of claim 2 in which said welding electrode means is rotatable and includes a plurality of welding projections successively engageable with successive juxtaposed nodes to cause the seriatim weldment thereof, said rotatable electrode means being rotated by engagement with said nodes.

4. The apparatus of claim 1 in which said welding circuit includes control means for firing the welding circuit when said welding electrode means is located in contiguity to the desired location on said strip.

5. The apparatus of claim 1 in which said welding head means includes a plurality of welding heads adjacent the perimeter of said forming means and engageable with successive portions of said strip as said forming means rotates relative to said welding heads.

6. The apparatus of claim 5 in which each of said welding heads incorporates an electrode engageable with said strip to weld the uppermost lamina of said strip to the lamina on which it is imposed.

7. The apparatus of claim 6 in which said electrodes of said welding heads are rotatable with said forming means to weld successive nodes of said superimposed laminae to each other.

8. The apparatus of claim 7 in which rotation of said electrodes is caused by engagement thereof with successive rotating corrugations of said strip.

9. An apparatus for welding successive, honeycomb core strip laminae to each other to form a circular honeycomb-type metallic seal comprising: a source of pre-formed core strip; a cylindrical, strippable seal form for imparting a circular configuration to successive laminae of said core strip when said core strip is wound thereabout; welding head means tangential to and relatively movable with respect to said seal form, said relative movement being caused by engagement of said welding head means with said core strip; and a source of welding potential connected to said welding head means and said seal form.

10. The apparatus of claim 9 in which said seal form is rotatable relative to said welding head means.

11. The apparatus of claim 10 in which said welding head means is located adjacent the rotatable perimeter of said seal form for welding engagement with said core strip as it is wound about said seal form.

12. The apparatus of claim 9 in which said seal form is of cylindrical configuration and includes a supporting surface for said core strip.

13. The apparatus of claim 9 in which said seal form has a conductive surface portion engageable by said core strip for causing said seal form to operate as a part of the welding circuit.

14. The apparatus of claim 9 in which a drive means is connected to said seal form to cause the rotation thereof.

15. The apparatus of claim 14 in which said drive means incorporates variable speed control means to raise or lower the speed of rotation of said seal form.

16. The apparatus of claim 9 in which said welding head means includes a plurality of welding heads located at the perimeter of said seal form to permit said welding heads to engage successive portions of said core strip.

17. The apparatus of claim 16 in which each of said welding heads includes a welding electrode engageable with successive portions of said core strip to weld contiguous areas thereof together.

18. The apparatus of claim 17 in which said electrodes are rotatable and incorporate welding protrusions for successive engagement with respective juxtaposed areas of said core strip.

19. The apparatus of claim 17 in which said rotary electrodes are rotatable by engagement with successive areas of said core strip to cause simultaneous rotation of said electrodes and said seal form.

20. An apparatus for welding continuous preformed core strip having male and female nodes into a circular seal, comprising: a supply of core strip; a rotatable seal form adjacent said core strip supply for receiving said core strip therefrom to form said core strip into a circular pattern with adjacent male and female nodes juxtaposed to each other; a plurality of welding heads located about the perimeter of said seal form, said welding heads including a master welding head and a slave welding head, said master welding head incorporating welding control means to fire said master and slave welding heads simultaneously when said welding heads are located adjacent superimposed male and female nodes; and a source of welding potential connected to said welding heads and to said seal form.

21. The apparatus of claim 20 in which said slave and master welding heads include rotatable electrodes having welding projections engageable with said male and female nodes to weld the same.

22. The apparatus of claim 21 in which the welding control means incorporated in said master welding head includes means for determining the location of said welding head with respect to said superimposed male and female nodal areas and means for reading said location-determining means.

23. The apparatus of claim 22 in which said location-determining means is constituted by a counting wheel and said reading device in constituted by a proximity switch.

24. The apparatus of claim 20 in which each of said welding heads includes a movable carriage and a rotatable welding sprocket having welding projections thereupon engageable with superimposed male and female nodal areas to weld the same.

25. The apparatus of claim 24 in which said welding sprocket is adjustable on said carriage.

26. The apparatus of claim 20 in which each of said welding heads includes a welding sprocket mounted on an axle in said carriage and brush means is provided for communicating said welding potential to said welding sprocket.

27. The apparatus of claim 26 in which said brush means is adjustable to vary the pressure on said axis.

28. The apparatus of claim 27 in which each of said welding carriages incorporates pressure adjustment means to urge said welding sprockets downwardly to cause uniform contact of each of said welding sprockets with said core strip.

29. The apparatus of claim 20 in which each of said welding heads includes a carriage movable between operative and inoperative positions.

30. The apparatus of claim 29 in which detent means maintains said carriages in said inoperative positions.

31. The method of fabricating a circular, honeycomb-type seal from a continuous pre-formed strip having alternate male and female nodes, comprising: forming said strip into a circular configuration on a cylindrical, conductive form with said male and female nodes juxtaposed to one another to permit the weldment thereof; simultaneously welding a plurality of said nodes to each other by engaging only the uppermost of said nodes during rotation of said form; and stripping said seal from said form upon completion of said seal.

32. The method of claim 31 in which said strip is rotated to facilitate successive weldment of said nodes.

33. The method of claim 32 in which the nodes being successively welded are interspersed among one another.

34. The method of claim 33 in which the weldment of one series of nodes determines the weldment of interspersed series of nodes.

* * * * *